United States Patent Office 3,395,122
Patented July 30, 1968

3,395,122
POLYURETHANES PREPARED FROM HOMO-
PIPERAZINE AND THE BISCHLOROFORM-
ATE OF A BISPHENOL
Paul Winthrop Morgan, West Chester, Pa., assignor to
E. I. du Pont de Nemours and Company, Wilmington,
Del., a corporation of Delaware
No Drawing. Filed Dec. 30, 1964, Ser. No. 422,408
4 Claims. (Cl. 260—47)

ABSTRACT OF THE DISCLOSURE

Soluble, high-melting, synthetic polyurethanes are prepared from homopiperazine and an aromatic bischloroformate. A typical polymer of this invention is poly[4,4'-isopropylidene bis(2,6-dichlorophenylene) 1,4-diazacycloheptane-1,4-dicarboxylate].

This invention relates to condensation polymers and more particularly to new soluble, high melting, synthetic linear polymers.

For various reasons, the presently known polyurethanes have not attained the commercial prominence of the polyamides and the polyesters to which they are structurally related. Fabrication of polyurethanes into fibers and films has often been hampered by poor chemical stability of the polymer at the temperatures required for melt processing or by insufficient polymer solubility for use of conventional solvent processing techniques. Moreover, the polyurethanes which have been found fabricable frequently lack the good balance of properties which is necessary for their use in fiber and film application. Among those undesirable characteristics contributing to poor performance for polyurethane fibers and films may be named the following: melting points sufficiently low to permit filament fusion during ironing, poor hot-wet recovery properties after washing, poor flex performance, sensitivity to dry cleaning solvents, and sensitivity to light.

High melting polyamides have generally been difficult to make, in part because of the poor solubility characteristics, but principally because the usual methods of melt polymerization have to be carried out at temperatures above the decomposition temperature of the polymer-making ingredients, the polymer itself or both. Because of generally poor solubility, many of the high melting polyamides known in the prior art cannot be satisfactorily prepared in solution. Furthermore, many of the high melting polyamides of the prior art cannot be melt spun and this, together with their insolubility, have made them unsuitable for commercial exploitation.

One object of this invention is to provide polyurethanes suitable for the production of light-stable, high melting flexible filaments and films. A further object is to provide polyurethane fibers which are particularly suitable for fabrics that are wash-wearable, i.e., fabrics which ideally resist wrinkling in use and which can be laundered and subsequently worn without ironing. A still further object of the present invention is to prepare high melting polyamides and polyureas which are soluble and from which useful filaments and films can be prepared. Other objects will appear hereinafter.

In accordance with the present invention there are provided high molecular weight fiber- and film-forming polymers containing amide or urethane linkages, said polymers consisting essentially of recurring units having the structure:

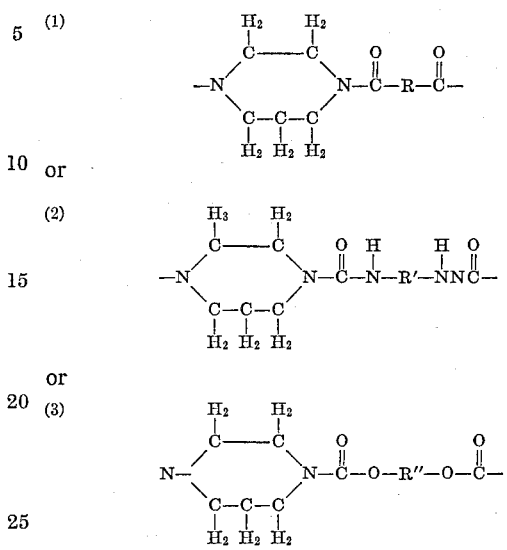

wherein R represents a radical of the class consisting of p-phenylene, m-phenylene, di(p-phenylene), oxy di(p-phenylene), methylene di(p-phenylene), isopropylidene di(p-phenylene), or sulfonyl di(p-phenylene) and R' represents a m-phenylene, p-phenylene, di(p-phenylene), methylene di(p-phenylene) or sulfonyl di(p-phenylene) radical and R" represents a radical of the class consisting of p-phenylene, alkylene di(p-phenylene), perhaloalkylene di(p-phenylene), cycloalkylene di(p-phenylene) or sulfonyl di(p-phenylene), and each aromatic nucleus of R, R', and R" may bear substituents selected from the class of halogen and lower alkyl radicals. Small amounts, up to about 10% by weight, of units not conforming to the respective formulae, above, may be present in the polymer chains.

The polyurethanes of the invention are prepared by reacting 1,4-diazacycloheptane with bischloroformates of dihydric phenols. Illustrative of such bisphenols are hydroquinone, 4,4'-isopropylidene bis(2,6-dichlorophenol), 4,4'-(hexafluoroisopropylidene) diphenol, 4,4'-isopropylidenediphenol, 4,4'-dihydroxydiphenyl ether, cyclohexylidene diphenol, and 4,4'-sulfonyldiphenol. Typical polyurethanes of the invention include poly(sulfonyl di-p-phenylene 1,4 - diazacycloheptane-1,4-dicarboxylate), poly(oxy di-p-phenylene 1,4-diazacycloheptane-1,4-carboxylate), poly(p-phenylene 1,4-diazacycloheptane-1,4-dicarboxylate), and poly[4,4'-isopropylidene bis(2,6-dichlorophenylene) 1,4-diazacycloheptane - 1,4-dicarboxylate].

The polyamides of the invention are prepared by reacting 1,4-diazacycloheptane with aromatic diacid chlorides. Dicarboxylic acids whose diacid chlorides are useful for the preparation of the new polyamides of this invention include terephthalic acid, isophthalic acid, 5-tert.-butylisophthalic acid, 5-chloroisophthalic acid, 4,4'-sulfonyl dibenzoic acid, bibenzoic acid, and bis(4-carboxylphenyl)ether. Typical polyamides of the invention include poly[1,4-diazacycloheptane 4,4' - oxy bis-(benzamide)], poly[1,4 - diazacycloheptane 4,4' - bis(benzamide)], and poly(1,4-diazacycloheptane terephthalamide).

The polyureas of the invention are prepared by reacting 1,4-diazacycloheptane with aromatic diisocyanates. Such diisocyanates include bis(4-isocyanatophenyl)methane, 4,4'-diisocyanatobiphenyl, 2,4-tolylenediisocyanate, 3,3'-dimethyl-4,4'-diisocyanatobiphenyl, bis(4-isocyanatophenyl)sulfone, and bis(4-isocyanatophenyl)ether. Typical polyureas of the invention include poly(2,4-tolylene 1,4-diazacycloheptane-1,4-dicarboxamide), poly(oxy di-p-phenylene 1,4-diazacycloheptane-1,4 - dicarboxamide), poly(4,4'-biphenylene 1,4-diazacycloheptane - 1,4-dicarboxamide), and poly(methylene di-p-phenylene 1,4-diazacycloheptane-1,4-dicarboxamide).

The singularly preferred polyurethane of this invention is that prepared from 1,4-diazacycloheptane and the bischloroformate of 4,4' - isopropylidene bis(2,6-dichlorophenol). The singularly preferred polyamide of this invention is that prepared from 1,4-diazacycloheptane and the diacid chloride of terephthalic acid.

As mentioned previously small amounts of units other than those defined above may be present in the polymer chain. This is achieved when the 1,4-diazacycloheptane radical is replaced in part by diamino radicals derived from m-phenylenediamine, p-phenylenediamine, 1,4-diaminocyclohexane, piperazine, 2-methylpiperazine, trans-2,5-dimethylpiperazine, ethylene diamine, hexamethylene diamine, when the indicated dicarboxylic acid radical is replaced in part by one from 1,4-cyclohexane dicarboxylic acid, succinic acid, or adipic acid, or when the indicated radicals of the diisocyanate are replaced by those of m-phenylene diisocyanate and p-phenylene diisocyanate.

The polymers of the present invention as defined by equations 1 and 3, above, may be prepared from nearly equimolar amounts of 1,4-diazacycloheptane and the appropriate diacid chloride or bischloroformate by interfacial polymerization which is accomplished by dissolving the diamine in aqueous alkali, dissolving the diacid chloride or bischloroformate in a water-immiscible organic solvent and combining the two phases with vigorous agitation. A catalyst, such as a quaternary ammonium salt, may also be employed. A second organic solvent, different from the one in which the diacid chloride or bischloroformate was dissolved, may be added at the conclusion of the reaction period in order to precipitate the polymer. In addition, those polymers of this invention defined by Equation 1 may be prepared by solution polymerization procedures well known in the art. The polymer(s) of the present invention defined by Equation 2, above, are most advantageously prepared by reacting 1,4-diazacycloheptane and the appropriate diisocyanate, for example, bis(4-isocyanatophenyl)methane, according to solution polymerization procedures well known in the art.

The polymers of this invention can be cast into films or dry spun into filamentary form from solutions containing about 10 to 30% by weight of the polymer dissolved in a solvent selected from the class consisting of tetrahydrofuran, a mixture of 1,1,2-trichloroethane/formic acid (70/30, wt./wt.), a mixture of 1,1,2-trichloroethane/trifluoroacetic acid (70/30, wt./wt.). Filaments can also be prepared by conventional wet spinning techniques. The instant polymers are readily and permanently orientable by attenuation and can be obtained in a crystalline state.

The polyurethanes of this invention possess melting points of at least 250° C., with some having melting points in excess of 300° C. This thermal stability is an important property in the synthetic textile trade, since many promising synthetic fibers have had only limited acceptance due to the low softening temperatures which they exhibit. Fibers and films prepared from the polyurethanes of this invention display excellent resistance to degradation by ultraviolet light, as witnessed by their color stability upon prolonged exposure (greater than 1000 hours) to the light from axenon arc when placed in a Model FDA-R Fade-Ometer, a product of the Atlas Electric Devices Company, Inc., Chicago, Ill. In contrast to the textile products obtained from the polyurethanes of the prior art, the unusual combination of desirable properties shown by filaments and fabrics prepared from these polyurethanes favors their commercial acceptance in the textile trade. Included in this list of properties, in addition to the previously-cited thermal stability and resistance to degradation by light, are compatability with commercial dry cleaning solvents, an excellent recovery of form without ironing when exposed to hot-wet conditions of home laundering, low shrinkage in boiling water, excellent resistance to degradation by aqueous solutions of alkali and mineral acids, excellent resistance to degradation and discoloration by household hypochlorite bleaches, and resistance to degradation by the thermal action of ironing at 200° C. after bleaching treatment. Films prepared from the polyurethanes of this invention are clear and flexible and are useful as wrapping or packaging materials, containers, covers, closures, and related uses wherein direct exposure to elemental conditions is inherent. The high-melting polyamides and polyureas of this invention can be spun into useful filaments and cast into strong clear flexible films.

The following nonlimiting examples are illustrative of the practice of the preferred embodiments of the invention. In these examples, inherent viscosity ($\eta_{inh}$) has been determined in accordance with the following equation:

$$\eta_{inh} = \ln \frac{(\eta_{rel})}{C}$$

The relative viscosity ($\eta_{rel}$) may be determined by dividing the flow time in a capillary viscometer of a dilute solution of the polymer by the flow time for the pure solvent. The concentration (C) used is 0.5 gram of polymer per 100 ml. of solution (0.5%) and the measurements are made at 30° C. Unless otherwise specified, inherent viscosities are measured in meta-cresol. Under these conditions of measurement, the polymers of the invention have an inherent viscosity of at least 0.2. As used herein, the "polymer melt temperature," abbreviated "PMT," is defined as that temperature at which a polymer sample becomes molten and leaves a trail when moved across a hot metal surface under moderate pressure. Fiber properties of tenacity, elongation, and initial modulus are reported in their conventional units and are coded as T/E/Mi.

Example I

This example illustrates the preparation of a polyurethane of this invention by interfacial polymerization.

To a solution of 1.0 g. (0.01 mole) of 1,4-diazacycloheptane and 2.12 g. of sodium carbonate in 100 ml. of water in a Waring Blendor is added a solution of 4.34 g. (0.0088 mole) of 4,4'-isopropylidenebis(2,6-dichlorophenylchloroformate) in 100 ml. of 1,2-dichloroethane. This reaction mixture is vigorously agitated for 5 minutes, after which 200 ml. of n-hexane are added to precipitate the polymer. After being washed well with water, the dried, granular polymer weighs 4.25 g. and exhibits a polymer melt temperature of 309° C.; $\eta_{inh} = 1.38$.

Example II

This example demonstrates the preparation of useful filaments and fabrics from a polyurethane prepared according to the procedure of Example I.

PART A

A polyurethane prepared according to the procedure of the previous example and having an inherent viscosity of about 1.0 is dissolved in tetrahydrofuran to form a spinning solution of 19% by weight solids. The solution is wet spun into a room temperature water bath. The resulting filaments are dried and drawn 3.8× at 225° C. to produce filaments which exhibit T/E/Mi values of 2.26/24/40, with a denier per filament value of 2.2. These filaments show excellent recovery of form after being angularly displaced into circular form following subjection to hot-wet conditions similar to those of home laundering.

Similarly-spun filaments, wound on a bobbin, show no change in tensile properties after being held in air in an oven at 200° C. for two hours. Taffeta fabrics woven from these filaments exhibit no shrinkage, weight loss, or change in appearance and toughness when treated for 2 hours in either 20% aqueous sodium hydroxide or in 20% surfuric acid solution at the boil, or for 100 hours/25° C. immersion in these solutions. When exposed to a direct flame, these fabrics only char and do not propagate the flame when it is removed.

PART B

A polyurethane prepared according to the procedure of Example I is dry spun from a 27% solids solution in tetrahydrofuran and the resultant filaments are drawn 4× at 205° C.; 1.2× at 225° C. to produce filaments which exhibit T/E/Mi values of 2.40/14.8/46.3 and a denier per filament value of 2.77. After these filaments are exposed in a Fade-Ometer to the light from a xenon arc for 525 hours, they exhibit T/E/Mi values of 1.9/9.3/40.1 and they show no coloration after 1,000 hours of such exposure.

Similarly spun filaments show no discoloration or damage when they are soaked for 2.5 hours at 27° C. in a bath of a commercially-available hydrochlorite bleach solution diluted to 1% available chlorine content and adjusted to a pH of 11.3. After these fibers have been rinsed with distilled water, they can be ironed at 200° C. without coloration or damage.

Dry-spun filaments of the polymer prepared according to Example I which have been boiled off in water for 0.5 hour, show less than 1% shrinkage when treated with percloroethylene at 60° C. for 1 hour.

Example III

This example illustrates the preparation of 4,4'-(hexafluoroisopropylidene)bis(phenylchloroformate) from 4,4'-(hexafluoroisopropylidene)diphenol. Synthesis of the latter is described by Knunyants et al., Bull. Acad. Sci. USSR, Div. of Chem. Sci. 1960, 647–653.

A reaction mixture comprising 50 g. (0.148 mole) of 4,4'-(hexafluoroisopropylidene)diphenol, 200 g. (2.02 moles) of phosgene, and 1.5 g. of N,N-dimethylformamide is heated for 6–8 hours in a Hastelloy alloy bomb whose internal temperature is maintained at 140° C. At the conclusion of the reaction period, the excess phosgene is vented. The residual product, a viscous oil, is subjected to vacuum distillation whereby a fraction (A) boiling at 157–160° C./0.3 mm., a pale yellow syrup, and a fraction (B) boiling at 170° C./0.5 mm., a clear liquid, are collected, leaving a brown tar in the distillation pot. After fractions (A) and (B) are permitted to stand for about 48 hours, they are readily crystallized by stirring to each yield essentially colorless crystals which weight 29.5 g. and 26.5 g., respectively, and melt sharply at 69–70° C. A mixed melting point determination shows no variation. The yield of 4,4'-(hexafluoroisopropylidene)bis(phenylchloroformate) is 79.5%.

In Table I, below, are summarized physical properties of various polyurethanes prepared in accordance with the interfacial polymerization techniques previously described. Each of the polymers consists essentially of recurring units of the following formula:

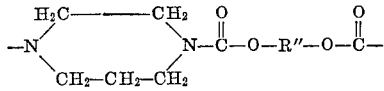

In Table I, the column entitled "Diphenol" denotes the diphenolic compound whose bischloroformate is employed in the polymerization of to provide the

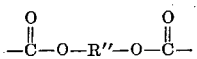

portion of the polyurethane. The column entitled "Film" describes the solvent from which clear, flexible films are prepared (refer to the Legend at the bottom of the table for explanation of the code letters).

TABLE I

| Ex. | Diphenol | PMT, °C. | $\eta_{inh}$ | Film |
|---|---|---|---|---|
| IV | Hydroquinone | 348 | 0.63 | A |
| V | 4,4'-isopropylidenediphenol | 222 | 0.67 | B |
| VI | 4,4'-(hexafluoroisopropylidene)-diphenol | 250 | 0.51 | C |

Legend:
A=1,1,2-trichloroethane/formic acid (70/30, wt./wt.) at 15% solids.
B=1,1,2-trichloroethane/trifluoroacetic acid (70/30, wt./wt.) at 13% solids.
C=Tetrahydrofuran at 15% solids.

Example VII

This example illustrates the preparation of a polyurea of this invention, corresponding to Formula 2 herein, by solution polymerization.

1,4-diazacycloheptane, 2.0 g., is dissolved in 240 ml. of water in a blender and a solution of 5.0 g. of bis(4-isocyanatophenyl)methane in 60 ml. of 1,2-dichlorethane is added with vigorous stirring. After 5 min., an equal volume of hexane is added to precipitate the polymer as a fine white powder. The yield of washed, dried polymer is 6.8 g. It has an inherent viscosity of 0.37 and a polymer melt temperature of 262° C.

Example VIII

This example demonstrates the preparation of a polyamide of this invention by interfacial polymerization.

1,4-diazacycloheptane, 3.0 g., and 2.4 g of sodium hydroxide are dissolved in 300 ml. of water in a blender. A solution of 6.09 g. of terephthaloyl chloride in 95 ml. of 1,2-dichloroethane is added with vigorous stirring. Polymeric material quickly formed as a gummy mass on the walls of the blender and the stirring blades. Hexane (200 ml.) is added to ensure complete polymer precipitation. The gum is collected and washed by kneading it manually under running water. After the polymer is dissolved in dichloromethane and precipitated in acetone, a fibrous, fluffy material is obtained in the dry state. The yield, but for mechanical losses, is nearly quantitative. The inherent viscosity is 1.29 and the polymer melt temperature is 320° C.

A clear, flexible film of this polyamide is obtained by casting a 12% solids content solution of the polymer dissolved in a mixture of chloroform/methanol (80/20, wt/wt).

In Table II, below, are summarized some physical properties of various polyamides prepared in accordance with the interfacial polymerization techniques previously described. Each of the polymers consists of recurring units of the following formula:

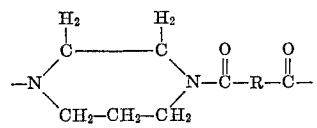

In Table II, the column entitled "Diacid Chloride" denotes the dicarboxylic acid from which

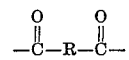

portion of the polyamide unit is derived. The polymers reported in this table are soluble in 1,1,2-trichloroethane/trifluoroacetic acid (70/30 by wt.) from solutions of which filaments can be dry spun and films cast.

TABLE II

| Example | Diacid Chloride | PMT, °C. | η inh |
|---------|-----------------|----------|-------|
| IX | Isophthalic | 242 | 1.34 |
| X | 5-tert.-butylisophthalic | 265 | 0.37 |
| XI | 5-chloroisophthalic | 260 | 0.90 |
| XII | 4,4'-sulfonyldibenzoic | 272 | 0.37 |

What is claimed is:

1. A high molecular weight fiber- and film-forming polyurethane consisting essentially of recurring units of the following structure

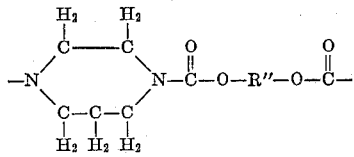

wherein R″ is selected from the group consisting of p-phenylene, alkylene di(p-phenylene), perhaloalkylene di-(p-phenylene), cycloalkylene di(p-phenylene), and sulfonyl di(p-phenylene) each of which may bear on the aromatic nuclei substituents selected from the class consisting of halogen and monovalent lower alkyl radicals, said polymer having an inherent viscosity at least 0.2 when measured as a 0.5% solution in meta-cresol at 30° C.

2. The polyurethane of claim 1 wherein —R″— is

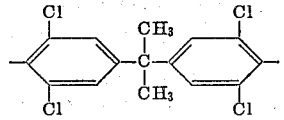

3. The polyurethane of claim 1 wherein —R″— is

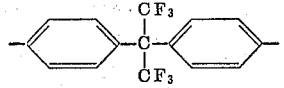

4. A fiber of the polymer of claim 2.

References Cited
UNITED STATES PATENTS

| | | | |
|---|---|---|---|
| 2,731,445 | 1/1956 | Wittbecker | 260—47 |
| 2,959,572 | 10/1960 | Blanchette | 260—78 |
| 3,296,201 | 1/1967 | Stephens | 260—47 |

WILLIAM H. SHORT, *Primary Examiner.*

L. LEE, *Assistant Examiner.*